Figure 1:
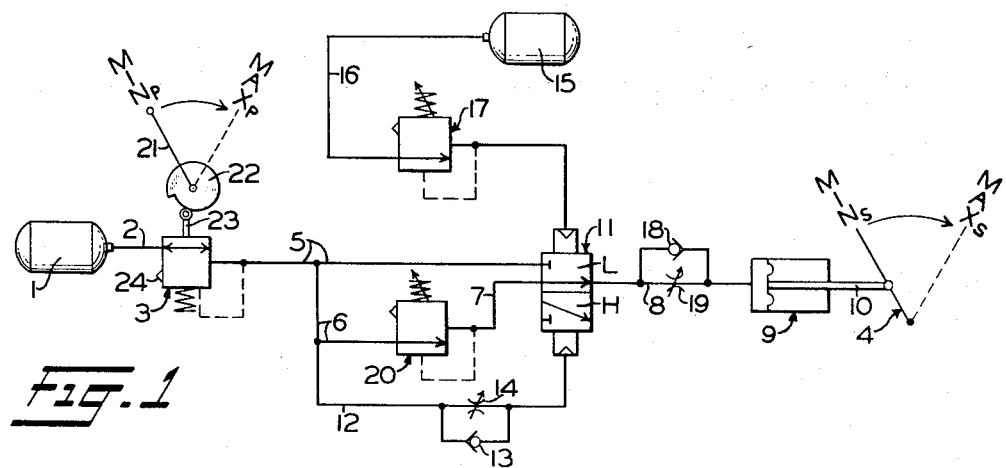

United States Patent [19]

Matsuda et al.

[11] 3,780,755

[45] Dec. 25, 1973

[54] AUTOMATIC SPEED CONTROL MEANS FOR A MARINE ENGINE

[75] Inventors: Tsutomu Matsuda, Akashi; Makoto Takagi, Kobe, both of Japan

[73] Assignee: The Nippon Air Brake Co., Ltd., Kobe, Japan

[22] Filed: Nov. 2, 1971

[21] Appl. No.: 194,899

[30] Foreign Application Priority Data
Nov. 5, 1970 Japan.............................. 45/97423

[52] U.S. Cl........................ 137/110, 91/29, 91/33, 123/98, 123/103
[51] Int. Cl. F16k 31/14, F15b 13/042, F02d 11/02
[58] Field of Search ..................... 91/28, 29, 33, 31, 91/32; 123/98, 103; 137/110; 251/28, 29

[56] References Cited
UNITED STATES PATENTS

| | | |
|---|---|---|
| 1,103,036 | 7/1914 | Clark ..................................... 91/29 |
| 1,428,998 | 9/1922 | Trace ..................................... 91/29 |
| 3,099,289 | 7/1963 | Neilson et al. .................. 137/596 X |
| 3,279,484 | 10/1966 | Brinkel ............................ 91/29 X |
| 3,485,222 | 12/1969 | Biermann ............................. 123/98 |

Primary Examiner—Irwin C. Cohen
Attorney—Ralph W. McIntire, Jr.

[57] ABSTRACT

Suppression apparatus interposable between an operator's speed controller and a throttle device in a fluid pressure operable speed control system for a marine engine driving a propeller carried on a propeller shaft, all of which, therefore, are subject to the phenomenon of vibratory resonance occurring within a critical range of speeds or rpm of the engine, said suppression apparatus being operative for automatically suppressing the effectiveness of that portion of a change-of-speed signal, when initiated by the operator, that would, in the absence of such suppression apparatus, produce an engine speed falling within low and high engine speed limits defining said critical range.

9 Claims, 3 Drawing Figures

AUTOMATIC SPEED CONTROL MEANS FOR A MARINE ENGINE

BACKGROUND OF THE INVENTION

In a propulsion system for a marine vessel wherein a propeller is driven by an engine through clutch means and a propeller shaft, a normal amount of vibration is caused by the propulsion system when the vessel is under way. Characteristically and as is known to those skilled in the art, such a propulsion system is subject to vibratory resonance, a phenomenon which causes maximum amplification of vibration when the frequency of the applied force from the engine coincides with the inherent or natural frequency of the vibrating body. Excessive vibration on a marine vessel not only causes discomfort to the occupants, but also causes loosening and excessive wear of moving parts. In a propulsion system, such as one having fluid pressure operable speed control means, for example, the period during which vibratory resonance occurs, that is, that zone or range between lower and upper limits of engine rpm at which said resonance commences and fades out, respectively, is determinable and, therefore, can be related to coinciding lower and upper degrees, respectively, of speed-controlling fluid pressure.

SUMMARY OF THE INVENTION

The object of the present invention, therefore, is to provide apparatus for use in a propulsion system for a marine vessel, whereby the amplified vibration caused by the phenomenon of vibrating resonance characteristic of the propulsion system, may be suppressed or practically eliminated.

The invention for suppressing vibratory resonance in a propulsion system for a marine vessel comprises a transition valve device and pressure-limiting valve devices interposed in fluid pressure operable speed control apparatus between an operator's manually operable speed controller and a fluid pressure responsive throttle device for establishing engine speed according to the degree of fluid pressure delivered to the throttle device. The transition valve normally occupies a low speed position in which control pressure is supplied to the throttle via a first limiting valve device which is set to cut off said supply, irrespective of the position to which the operator's controller is operated, when the degree of such control pressure reaches a certain low value or pressure just below that pressure that produces a certain corresponding low engine rpm at which vibratory resonance commences, said control pressure also being delivered simultaneously to a low pressure side of the transition valve device in bypassing relation to the first limiting valve device. Fluid pressure at a constant degree is supplied via a second limiting valve device to a high pressure side of the transition valve device, in opposing relation to pressure acting on the low pressure side, for normally maintaining said transition valve device in its low speed position, said constant degree of pressure being equivalent to a certain high pressure just above that pressure that produces a certain corresponding high engine rpm at which vibratory resonance fades out. When the pressure acting on the low pressure side of the transition valve device exceeds the constant pressure acting on the high pressure side, said transition valve device is shifted to a high speed position in which delivery of control fluid pressure to the throttle device through the first limiting valve device is cut off and is delivered directly through said transition valve device, whereby the range of fluid pressure between the certain low and high pressures between which vibratory resonance occurs, is, in effect, bypassed or suppressed.

Figure 2:
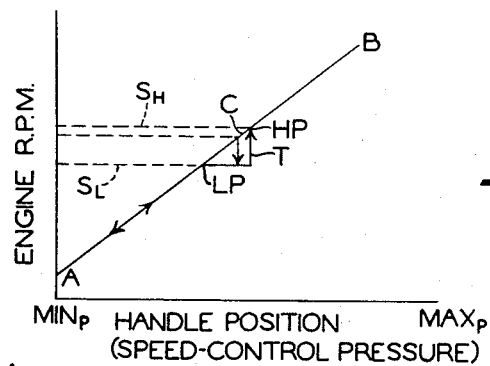
Figure 3:
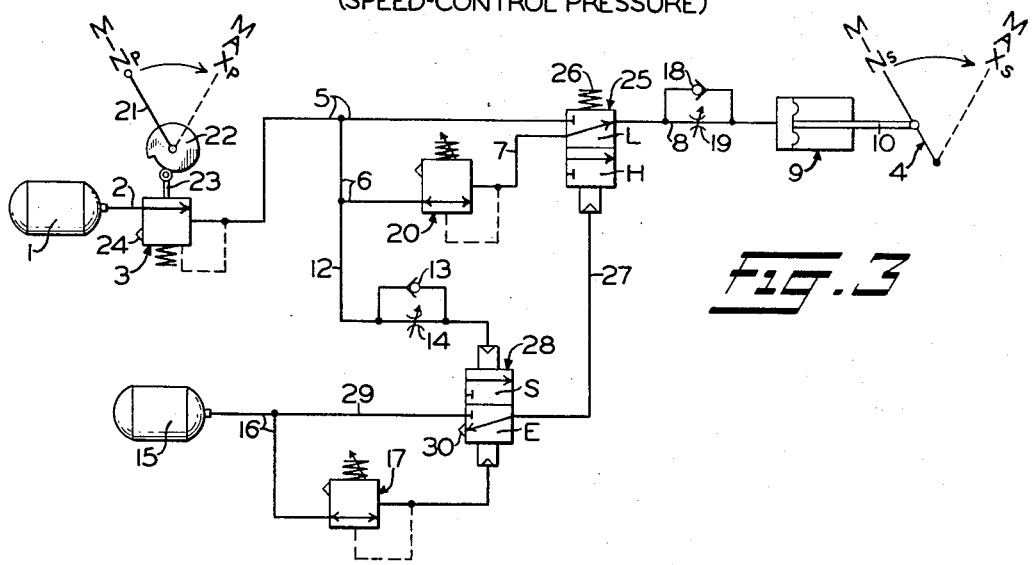

In the single sheet drawing, FIG. 1 is a schematic view of a marine engine speed control apparatus embodying the invention; FIG. 2 shows a graphic representation of the function of the apparatus shown in FIG. 1; and FIG. 3 is a schematic view of a modified form of the apparatus shown in FIG. 1.

DESCRIPTION AND OPERATION

The speed control apparatus for a marine engine (not shown) and embodying the invention, as shown in FIG. 1, comprises a first source of fluid under pressure 1 connected via a pipe 2 to an operator's manually operable speed controller 3 which effects supply of variable speed-control pressure to an engine throttle device 4, shown symbolically, via a supply pipe comprising pipe segments 5, 6, 7 and 8, said last pipe segment 8 being connected to a piston type fluid pressure operable positioner 9 which, in turn, is mechanically connected by a piston rod 10 to the throttle device 4. In that the throttle device 4 is of conventional type, it is not deemed necessary, therefore, to show or describe the structure thereof in detail. Very simply, the throttle device 4 may comprise valve means (not shown) which may be operable by a lever connected to piston rod 10 of the pressure operable positioner 9, from a normally closed or idling position corresponding to zero speed, indicated as $MIN_s$ in the drawing, through a variably open position for effecting engine speeds ranging from said zero speed to a maximum speed indicated as $MAX_s$ in the drawing, according to the degree to which said valve means is opened.

The inlet side of a transition valve device 11, which is shown symbolically, is connected to pipes 5 and 7, while the outlet side is connected to pipe 8. The transition valve device 11 is subjected at one end, or low pressure side, to pressure prevailing in pipe 6 by way of a pipe 12 in which a one-way check valve 13 and an adjustable choke 14 are interposed. The check valve 13 and choke 14 are in parallel relation to each other with the unchecked flow through said check valve moving from pipe 6 toward the transition valve device 11. The other end, or high pressure side, of the transition valve device 11 is subjected to a constant pressure, which, for purposes of convenience, will hereinafter be known as a certain high pressure supplied from a source 15 (which could also be supplied from source 1, if desired) via a pipe 16 and a limiting valve device 17 interposed in said pipe, said limiting valve device being effective for limiting the pressure of fluid supplied to said high pressure side to said certain high pressure for a purpose to be hereinafter set forth.

The fluid pressure acting on the high pressure side of transition valve device 11 normally maintains said transition valve device in a low speed position in which it is shown symbolically in the drawing by a block L and in which pipe 7 is communicated with pipe 8 to thus provide actuating fluid pressure to the positioner device 9. When the pressure acting on the low pressure side of the transition valve device 11 exceeds the pressure acting on the high pressure side, in a manner to be hereinafter explained, said valve device is operated from its said low speed position to a high speed position, represented symbolically by a block H, in which pipe 8 is cut off from communication with pipe 7 and is placed in communication with pipe 5.

Control fluid pressure for actuating positioner 9, whether supplied from pipe 5 or pipe 7, flows through pipe 8 in which a one-way check valve 18 and adjustable choke 19 are interposed in parallel relation. Since the direction of flow through check valve 18 is from the positioner 9 toward transition valve device 11, control fluid for actuating said positioner must flow through the adjustable choke 19, which is set to permit adequate flow therethrough but does act to check accidental unabated flow to the positioner, thus preventing any sudden, erratic action of the throttle 4.

When speed control pressure is supplied to pipe 8 from pipe 7, that is, with transition valve device 11 in the L position, such control pressure is supplied through a limiting valve device 20 having pipe 7 connected on the inlet side thereof and pipe 8 connected on the outlet side thereof. The limiting valve device 20 is set so as to limit delivery of fluid pressure from pipe 8 to pipe 7 at a pressure less than the certain high pressure acting on the high pressure side of transition valve device 11 or at a pressure which, for purposes of convenience, will hereinafter be known as a certain low pressure.

The operator's speed controller 3 is provided with an operator's handle 21 which is manually operable through a speed control pressure zone ranging from a minimum pressure position, indicated $MIN_p$ in the drawing, to a maximum pressure position indicated $MAX_p$ in the drawing. As the handle 21 is rotated clockwise, for example, as viewed in the drawing, a cam 22 acts in conventional manner on a valve stem 23 to operate a supply valve member (not shown) for effecting supply of speed control fluid to pipe 5 at a pressure commensurate with the amount of such clockwise movement of said handle. Counterclockwise rotation of the handle 21 effects a reduction of fluid pressure in pipe 5 corresponding to the amount of such counterclockwise movement. With the handle 21 in the $MIN_p$ position and, therefore, a minimum supply of control pressure to positioner 9, the engine throttle 4 assumes a zero speed position correspondingly indicated $MIN_s$ in the drawing and above defined, while operation of said handle to its $MAX_p$ position causes a corresponding supply of maximum control pressure to positioner 9 and, therefore, operation of said engine throttle, as will presently be described, to a maximum speed position indicated $MAX_s$ in the drawing and above defined.

As was above noted, vibratory resonance occurs within the limits of a determinable range of engine speeds or a resonance zone, that is, resonance commences at a certain low speed and fades out at a certain high speed of the engine, which speeds are normally effected when the controller handle 21 is operated to the proper positions at which speed-control fluid is supplied at necessary pressure for producing such speeds. The degrees of speed-control fluid pressure which produce the certain low and certain high pressures, respectively, mentioned above, at which the limiting valves 20 and 17, respectively, are set.

In operation, therefore, as the operator moves the controller handle 21 in a clockwise direction out of the $MIN_p$ position, the supply valve member (not shown) in the controller 3 effects supply of fluid from source 1 to pipes 5, 6 and 12 at a pressure corresponding to the amount of handle movements. Since the transition valve device 11 is initially in the L position, as shown, fluid pressure in that portion of pipe 5 connecting to said transition valve device is cut off thereat, whereas fluid pressure feeding into pipe 6 flows through the limiting valve device 20 to pipe 7, thence, as above described, to the positioner 9 for setting the throttle 4 accordingly, so long as said fluid pressure does not exceed the certain low pressure. At the same time, fluid pressure also flows from pipes 5 and 6 and via pipe 12 to the low pressure side of transition valve device 11.

If the operator continues clockwise movement of handle 21 sufficiently to charge pipes 5, 6 and 12 with fluid at a pressure exceeding the certain low pressure but less than the certain high pressure, limiting valve 20 operates in conventional manner to a lap position in which the pressure of fluid flowing to pipe 7, and therefore to positioner 9, is limited to and maintained at a pressure corresponding to the certain low pressure, whereas fluid pressure acting on the low pressure side of the transition valve device 11 via pipe 12 is the actual pressure corresponding to the handle position. At this point, it should be kept in mind that if the actual pressure in excess of the certain low pressure were to have been permitted to reach the positioner 9 and set the throttle 4 accordingly, vibratory resonance would have set in, but due to limiting action by the limiting device 20, such vibratory resonance is precluded.

If the operator continues with further clockwise movement of handle 21, fluid pressure in pipes 5, 6 and 12 is correspondingly increased, so that if and when said fluid pressure is increased sufficiently, that is, to a degree exceeding the certain high pressure corresponding to the degree of pressure acting on the high pressure side of the transition valve device 11, such increased pressure acting on the low pressure side of said transition valve device causes operation of the valve device, in conventional manner, from low pressure position L to high pressure position H, thus cutting off supply of speed-control pressure from pipe 7 and establishing supply of speed-control pressure for the positioner 9 directly from pipe 5 which is charged with fluid at pressure corresponding to the actual position of handle 21. Thus, shifting of transition valve device 11, which is a rapid, instantaneous operation, from position L to position H is delayed from the moment at which fluid in pipes 5, 6 and 12 attains a pressure equivalent to the certain low pressure until the moment that such pressure in said pipes has attained a value equivalent to the certain high pressure, so that the effect of those pressures lying in a critical zone between said certain low and certain high pressure is suppressed or bypassed, and therefore the vibratory resonance that would normally result from the corresponding engine speeds produced by such pressure within said range, is avoided.

If the operator wishes to reduce the speed of the vessel, the handle 21 is rotated counterclockwise to effect a reduction of speed-control fluid pressure in pipes 5, 6 and 12. If the transition valve device 11 is in position H when reduction of speed-control pressure is initiated, and as long as said transition device remains in said position H, the effect of such reduction is reflected immediately at the positioner 14 and the throttle 4 since fluid pressure from said positioner is released directly through pipe 8, check valve 18, the transition valve device, pipe 5, and an atmospheric vent 24 in the operator's controller 3. At the same time, fluid pressure acting on the low pressure side of transition valve 11 is also reduced, but such reduction, due to the effect of choke 14 through which said reduction is directed, momentarily lags the reduction of fluid pressure from the positioner 9 to prevent shifting of said transition valve from position H to position L and, therefore, permit effective reduction of pressure from said positioner.

When pressure acting on the low pressure side of transition valve 11 has reduced to a value less than that of pressure acting on the high pressure side, which, as above noted is equivalent to the certain high pressure, the transition valve will shift from position H to position L, thereby also shifting the supply of control pressure to the positioner 9 from pipe 5 to pipe 7, which, as above noted, is limited to the certain low pressure. Thus, even during deceleration operation, the critical resonance zone is bypassed or suppressed.

In the drawing, FIG. 2 very simply illustrates, in graphic form, the straight-line acceleration and deceleration functions, as above described, of the apparatus shown in FIG. 1. The line A–B represents coordinates of the position of handle 21, that is, the degree of control pressure represented by the horizontal axis and the resulting speed or rpm of the engine represented by the vertical axis for both acceleration and deceleration, as indicated by the arrow heads on line A–B. Considering the acceleration function, as expected the engine rpm increases in direct proportion to increase of control pressure until the value of control pressure attains the certain low pressure above defined and indicated as point LP on the graph, at which point engine speed levels off to a constant rpm, coinciding with a broken horizontal line designated $S_L$, while control pressure continues to increase. When speed-control pressure has increased to the value defined above as the certain high pressure, indicated as point HP on the graph, the transition valve 11 shifts from position L to position H, to cause engine rpm to jump immediately from $S_L$ rpm to a higher rpm, coinciding with a broken horizontal line designated $S_H$ on the graph. The transition of engine rpm from $S_L$ to $S_H$ is represented by a vertical portion T of the line A–B.

In the graph shown in FIG. 2, the deceleration operation or function is represented generally by the same line A–B with the exception of a slight lagging or hysteresis when the transition valve device shifts from position H to position L, said lagging being represented by a small segment C of the line A–B. This condition may be corrected by modifying the apparatus in the manner shown in FIG. 3.

A transition valve device 25 is interposed between pipes 5 and 7 and 8, with said pipes 5 and 7 connected to the inlet side and pipe 8 connected to the outlet side. Transition valve device 25, similarly to transition valve device 11, has a low pressure or L position, in which pipe 7 is communicated with pipe 8, and a high pressure or H position in which communication between pipes 7 and 8 is cut off and pipe 5 is communicated with pipe 8. Transition valve 25, however, unlike transition valve 11, is normally maintained in its position L by a pre-set spring 26 acting on a low pressure side thereof, said spring being set to exert a biasing force on said low pressure side equivalent to the certain low pressure, that is, the minimum pressure just above which vibratory resonance commences, as above defined. The opposite or high pressure side of transition valve 25 is connected to one end of a pipe 27 the other end of which is connected to the outlet side of a transition valve device 28.

The transition valve device 28 is interposed between pipe 27 and a branch pipe 29 connected at one end to the inlet side of said transition valve and at the other end to pipe 16. Transition valve 28 is normally maintained in an exhaust position indicated, symbolically as position E in FIG. 3 of the drawing, by fluid pressure from source 15 acting on a high pressure side thereof, the degree of such pressure being equivalent to the certain high pressure, above defined, as established by the limiting valve device 17. In position E of transition valve 28, pipe 27 and, therefore, the high pressure side of transition valve 25 is vented to atmosphere via a vent port 30 in said transition valve. An opposite or low pressure side of transition valve 28, which is connected to pipe 12, is subjected to fluid pressure prevailing in said pipe as established by the operator's controller 3. When the pressure acting on the low pressure side of transition valve 28 exceeds the pressure acting on the high pressure side, as will be hereinafter explained, said transition valve is operated from its position E to a supply position, indicated symbolically in the drawing as position S, in which pipe 27 and, therefore, the high pressure side of transition valve 25 is cut off from atmosphere via vent port 30, and pipe 29 is placed in communication with pipe 27.

When the handle 21 is rotated clockwise, speed-control fluid pressure supply is effected from the source 1 to pipes 5, 6 and 12. Since transition valve 25 is in position L, flow from pipe 5 to pipe 8 is cut off while flow from pipe 6 flows through limiting valve 20 to pipe 7, through said transition valve to pipe 8 and consequently to positioner 9 to operate throttle 4.

If clockwise rotation of handle 21 is continued, limiting valve 20 eventually operates to limit the pressure of fluid flowing to pipe 7 to the certain low value, above defined. Continued increase of pressure in pipes 5, 6 and 12, though limited to pipe 7 to the certain low pressure by limiting valve 20, does effect a corresponding increase of fluid pressure in pipe 12 and, therefore, acting on the low pressure side of transition valve 28, and if such continued increase of fluid pressure exceeds the certain high pressure acting on the opposite high pressure side of said transition valve, said transition valve is operated from position E to position S. With transition valve 28 in position S fluid pressure from source 15 is connected directly through pipe 29, said transition valve, and pipe 27 to the high pressure side of transition valve 25, whereupon transition valve 25 is shifted from position L to position H and, as above described, fluid pressure flows directly from pipe 5 to pipe 8 with pipe 7 cut off. Positioner 9 is thus subjected to speed-control fluid pressure at a degree equivalent to or greater than the certain high pressure, depending on the position to which handle 21 is operated relative to said certain high pressure.

In the deceleration procedure, handle 21 is rotated counterclockwise to effect a decrease of fluid pressure in pipes 5, 6 and 12 through vent 24. The pressure acting on positioner 9 is decreased accordingly and directly through check valve 18, whereas the pressure acting on the low pressure side of transition valve 28 is also decreased but through the regulated choke 14 and is therefore momentarily delayed to insure that both transition valves 25 and 28, for the time being, remain in their respective positions H and S, thereby assuring the proper reduction of pressure in positioner 9 and pipe 8 before changeover operation of said transition valves.

When the pressure acting on low pressure side of transition valve 28 has reduced to a value less than the certain high value acting on the high pressure side, said transition valve immediately shifts from position S to position E in which latter position fluid pressure acting on the high pressure side of transition valve 25 is immediately released to atmosphere via pipe 27, transition valve 28, and vent port 30. The result is an immediate shift of transition valve 25 from position H to position L without any hesitation, as occurs with transition valve 11 in the apparatus shown in FIG. 1 due to the momentary restriction imposed by choke 14 on release of fluid pressure from the low pressure side of transition valve 11. In the apparatus shown in FIG. 3, therefore, the hysteresis characteristic of the apparatus shown in FIG. 1 and above discussed, is eliminated by the arrangement shown.

Having now described the invention, what we claim as new and desire to secure by Letters Patent, is:

1. Automatic speed control apparatus for use with a propulsion system including an engine and a propeller mounted on a propeller shaft driven by the engine, such a propulsion system being normally subjectable to vibratory resonance occurring within a certain range of engine speeds, said speed control apparatus comprising the combination of:
   a. fluid pressure responsive throttle valve means operable for effecting engine speed at a degree corresponding to the degree of control fluid pressure supplied to the throttle valve means;
   b. a first source of fluid under pressure;
   c. operator's control means having a manually operable handle for effecting supply of control fluid pressure from said source to said throttle valve means at a degree corresponding to the preselected position to which said handle is operated within a control pressure supply zone ranging from a minimum control pressure position to a maximum control pressure position, said control pressure zone including a critical zone of handle positions effective for causing said engine speeds within said certain range and within which said vibratory resonance occurs; and
   d. suppression means interposed between said operator's control means and said throttle valve means for limiting said control pressure supplied to said throttle valve means to a certain low pressure corresponding to that pressure at the lower limit of said critical zone which produces engine speed at which said vibratory resonance is initiated, during such time that said handle occupies any position within said critical zone, and being operable responsively to control pressure corresponding to and exceeding a certain high pressure at the upper limit of said critical zone, which effects engine speed at which said vibratory resonance is terminated, for providing supply of control pressure to said throttle valve means at a degree exceeding said certain high pressure.

2. Automatic speed control apparatus, as defined in claim 1, wherein said suppression means comprises:
   a. a first pressure limiting device operative for limiting delivery of control fluid pressure therethrough from a zero pressure up to said certain low pressure;
   b. a second pressure limiting device operative for effecting delivery of control fluid pressure therethrough at a degree corresponding to said certain high pressure; and
   c. a transition valve device interposed between said operator's control means and said throttle valve means, said transition valve device being subject and operable responsively to fluid pressure from said second pressure limiting device to a first position for effecting a low pressure communication, including said first pressure limiting device, via which control fluid is delivered from said source to said throttle valve means at a pressure up to said certain low pressure, and
   d. said transition valve device being subject to said control fluid at the pressure effected by said operator's control means, in opposing relation to said fluid pressure delivered thereto via the second pressure limiting device, and operable responsively to such control fluid at a pressure exceeding said certain high pressure to a second position for effecting a high pressure communication via which control fluid is delivered from said source to said throttle means in bypassing relation to said low pressure communication and at a pressure exceeding said certain high pressure.

3. Automatic speed control apparatus, as defined in claim 1, wherein said throttle valve means comprises:
   a. a throttle valve device; and
   b. a fluid pressure operable positioner operable responsively to said control fluid for setting said throttle valve device to effect engine speed according to the degree of pressure of said control fluid delivered to the positioner.

4. Automatic speed control apparatus, as defined in claim 3, wherein said handle is rotatable in one direction for effecting an increased delivery of control fluid to the positioner and consequent increased acceleration of the engine and being rotatable in an opposite direction for effecting release of control fluid from the positioner and consequent deceleration of the engine.

5. Automatic speed control apparatus, as defined in claim 4, further characterized by first choke and check means disposed in parallel flow relation to each other and interposed between the suppression means and the throttle valve means for providing regulated flow of control fluid in one direction to the positioner during acceleration of the engine and uninhibited flow of control fluid in a reverse direction from the positioner during deceleration of the engine.

6. Automatic speed control apparatus, as defined in claim 2, further characterized by second choke and check means disposed in parallel flow relation to each other and interposed between said operator's control means and said transition valve device in parallel relation to said first pressure limiting device for providing uninhibited flow of control fluid in one direction to the transition valve device during acceleration of the engine and regulated flow of control fluid in a reverse direction from the transition valve device during deceleration of the engine.

7. Automatic speed control apparatus, as defined in claim 1, wherein said suppression means comprises:
   a. a first transition valve device interposed between said operator's control means and said throttle valve means, said first transition valve device including valve means and biasing means for exerting on said valve means a biasing force equivalent to that of said certain low pressure for operating said valve means to a first position for providing a low pressure communication via which control fluid is delivered from said first source to said throttle valve means at a pressure up to said certain low pressure, b. said valve means of said first transition valve device being operable responsively to a fluid pressure force exceeding and in opposing relation to said biasing force to a second position for providing a high pressure communication via which control fluid is delivered from said first source to said throttle valve means in bypassing relation to said low pressure communication and at a pressure exceeding said certain high pressure;

c. a second source of fluid under pressure;

d. a second transition valve device interposed between said second source and said first transition valve device and in communication with said operator's control means for controlling supply and release of fluid pressure providing said fluid pressure force acting on said first transition valve device in opposition to said biasing force, said second transition valve device being subject and operable responsively to fluid from said second source at a pressure corresponding to said certain high pressure to a normal exhaust position in which said first transition valve device is relieved of said fluid pressure providing said fluid pressure force, e. said second transition valve device being subject to said control fluid simultaneously to supply thereof to said throttle valve means, in opposition to the fluid pressure urging said second transition valve device to its said exhaust position, and being operable responsively to said control fluid at a pressure exceeding said certain high pressure to a supply position in which fluid is supplied to said first transition valve device for providing said fluid pressure force and effecting operation of said first transition valve device to its said second position; and f. a first pressure limiting device interposed in said low pressure communication for limiting delivery of said control fluid therethrough from a zero pressure up to said certain low pressure.

8. Automatic speed control apparatus, as defined in claim 7, wherein said suppression means further comprises a second pressure limiting device interposed between said second source and said second transition valve device for limiting the pressure of fluid urging said second transition valve device to its said exhaust position to a degree equivalent to said certain high pressure.

9. Automatic speed control apparatus, as defined in claim 8, further characterized by choke and check means disposed in parallel flow relation to each other and interposed between said operator's control means and said second transition valve device for providing uninhibited flow of control fluid in one direction to said second transition valve device during operation of said operator's control means for effecting acceleration of the engine and for providing regulated flow of said control fluid in a reverse direction from said second transition valve device during operation of the operator's control means for effecting deceleration of the engine.

* * * * *